(12) United States Patent
Otto et al.

(10) Patent No.: US 8,211,355 B2
(45) Date of Patent: Jul. 3, 2012

(54) ROTARY FORMING WHEEL

(76) Inventors: Melvin Otto, Gladwin, MI (US); Joe Garvin, Shepherd, MI (US)

(*) Notice: Subject to any disclaimer, the term of this patent is extended or adjusted under 35 U.S.C. 154(b) by 0 days.

(21) Appl. No.: 13/135,352

(22) Filed: Jul. 1, 2011

(65) Prior Publication Data

US 2011/0260374 A1 Oct. 27, 2011

(51) Int. Cl.
- B28B 21/08 (2006.01)
- B29C 51/00 (2006.01)
- B28B 1/52 (2006.01)

(52) U.S. Cl. ............ 264/553; 425/442; 425/388; 264/87
(58) Field of Classification Search .................. 425/388, 425/433, 406, 342.1, 441, 442; 264/86, 87, 264/553

See application file for complete search history.

(56) References Cited

U.S. PATENT DOCUMENTS

| | | |
|---|---|---|
| 3,470,281 A | 9/1969 | Knowles |
| 3,578,735 A | 5/1971 | Cholmar et al. |
| 3,600,753 A | 8/1971 | Otto |
| 6,086,800 A | 7/2000 | Manlove |
| 6,394,783 B1 | 5/2002 | Dalgewicz, III et al. |
| 6,814,905 B1 | 11/2004 | Dalgewicz et al. |
| 6,976,835 B1 | 12/2005 | Tucker |
| 2007/0224306 A1* | 9/2007 | van Esbroeck et al. ........ 425/357 |
| 2008/0066853 A1* | 3/2008 | Schiebout ..................... 156/261 |
| 2008/0229943 A1* | 9/2008 | Barinaga et al. .............. 101/110 |
| 2010/0055272 A1* | 3/2010 | Van Esbroeck et al. ...... 426/389 |
| 2011/0180976 A1* | 7/2011 | Yano ............................. 264/517 |
| 2012/0021104 A1* | 1/2012 | Van Esbroeck et al. ...... 426/280 |

* cited by examiner

*Primary Examiner* — Joseph Del Sole
*Assistant Examiner* — Nahida Sultana
(74) *Attorney, Agent, or Firm* — Robert L. McKellar; McKellar IP Law, PLLC (57) ABSTRACT

Rotary forming drums that have a unique vacuum distribution and control system imparting a vacuum to the insert trays in a region or zone of the drum in a controlled manner. The rotary drum also has insert trays that are forced outward by the movement of follower cam activation upon a roller cam which in turn forces molded articles from the trays quickly, cleanly and efficiently. Once the product is removed from the insert trays internal and external springs return the insert trays to their original position to repeat the process on a continuous basis.

1 Claim, 11 Drawing Sheets

ROTARY FORMING WHEEL

This application claims priority from U.S. Provisional Patent Application 60/761,469 filed Jan. 24, 2006 and Ser. No. 11/656,166 filed Jan. 22, 2007.

The invention disclosed and claimed herein deals with rotary forming drums that are equipped with a plurality of pivotally mounted insert trays that pivot outward to force a rapid, efficient and complete detachment of formed material from the insert trays. Also disclosed is an integral vacuum distribution and control system for the drum.

BACKGROUND OF THE INVENTION

Rotary forming drums and the process they are used in are not new to the art. As described in U.S. Pat. No. 6,086,800 issued to Manlove on Jun. 11, 2000 there is a Flat Bed Thermoforming process which is further noted by the citation of U.S. Pat. Nos. 3,470,281, 3,578,735, and 3,600,753 therein. Other United States Patents that disclose thermoforming processes using rotary forming drums include U.S. Pat. Nos. 6,814,905, 6,976,835 and 6,394,783.

However, all of these prior art patents fail to disclose a rotary forming drum that has the clear advantages of the instant invention. The novel vacuum distribution and control system of the instant invention allows for rapid induction of molten thermoplastic into the trays of the rotary forming drum. After the vacuum phase is completed the articles of the tray cool proceed along the drum. As they near their exit point the novel trays of the rotary forming drum pivot outward via the cam follower activating the cam roller. The trays move outward, forcing the formed articles from the trays cleanly and efficiently. The trays then are returned to their original position via a set of internal and external return springs. It should be noted that the trays of this invention contain cavities i.e. female molds, as opposed to the projections, i.e. male molds of the prior art.

THE INVENTION

The invention is a rotary forming drum that has pivoting trays. The trays move outward or upward forcing the molded articles from the trays. A follower cam activates a roller cam moving the tray away from the rotary forming drum, and then a set of internal and external springs returns the tray to its original position. The drum incorporates a unique and novel distribution and control vacuum system allowing a zone of the drum to remain under constant vacuum as the trays of the drum pass through the zone. The vacuum draws the thermoformed plastic into the insert trays within the vacuum zone allowing for consistent forming along the entire vacuum zone of the rotary forming drum.

Thus, what is disclosed and claimed herein is a rotary forming drum for forming thermoplastic materials comprising in combination a vacuum distribution and control system, a plurality of pivoting trays connecting two spaced-apart drums, wherein the vacuum distribution and control system comprises a vacuum zone, wherein the vacuum zone comprises a vacuum induction plate, a vacuum zone plate and a vacuum adaptor plate.

The vacuum induction plate is mounted to the rotary forming drum and contains a plurality of openings through it for vacuum distribution. The vacuum zone plate surmounts the induction plate and has an arcuate slot adjoining a portion of the openings through the induction plate.

The adaptor plate is surmounted on the vacuum zone plate with an opening through it to permit vacuum flow through it.

There are vacuum hoses connecting the vacuum distribution and control system to the trays. Each of the pivoting trays is controlled by a roller cam, a cam follower, internal return springs, and external return springs, such that each pivoting tray is capable of outward movement away from the rotary forming drum. The cam follower and the roller cam effect this movement.

DETAILED DESCRIPTION OF THE DRAWINGS

Figure 1:
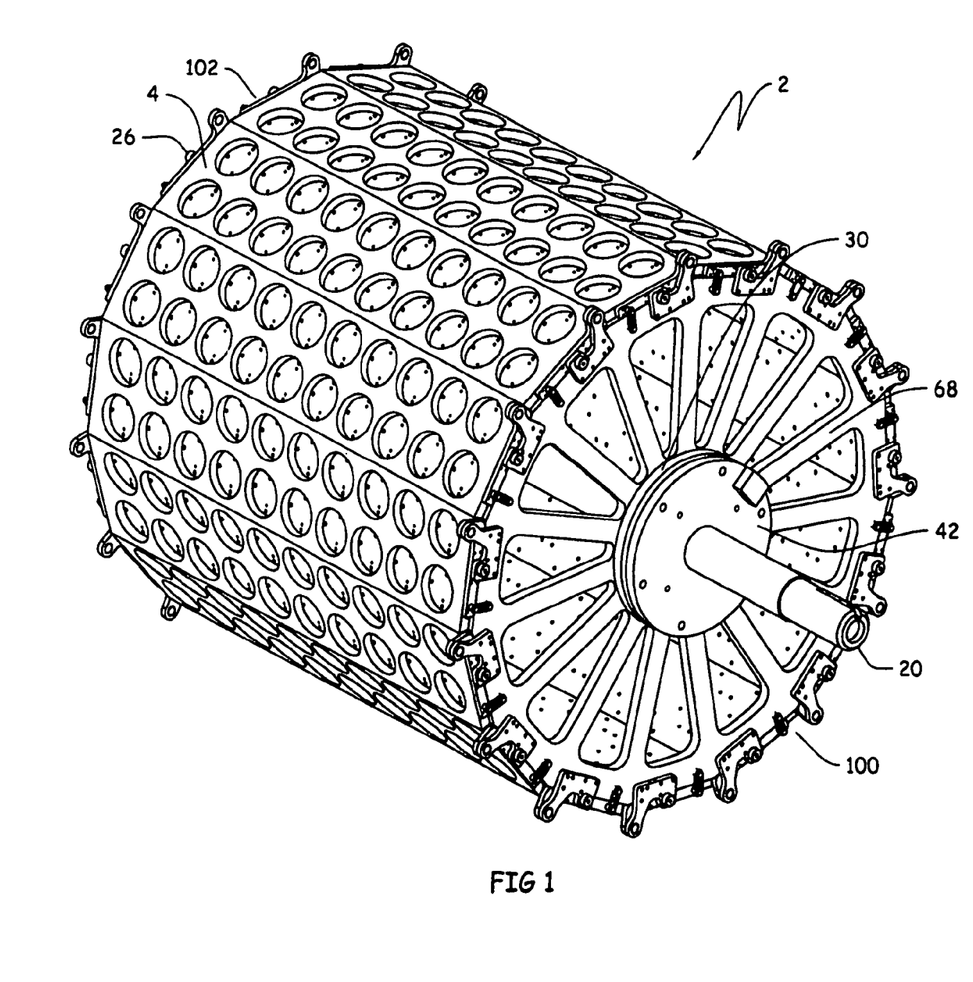
FIG. 1 is a full view in Figure of a rotary forming drum of this invention.

FIG. 1 is a full top view of a rotary forming drum 2 with insert trays 4. This view shows the instant invention with a portion of the plurality of inset trays 4. The distal end 102 of rotary forming drum shows a plurality of cam rollers 26. The near end 100 of rotary forming drum 2 shows the vacuum induction plate 30, the vacuum zone plate 36 and the vacuum adaptor plate 42.

Figure 2:
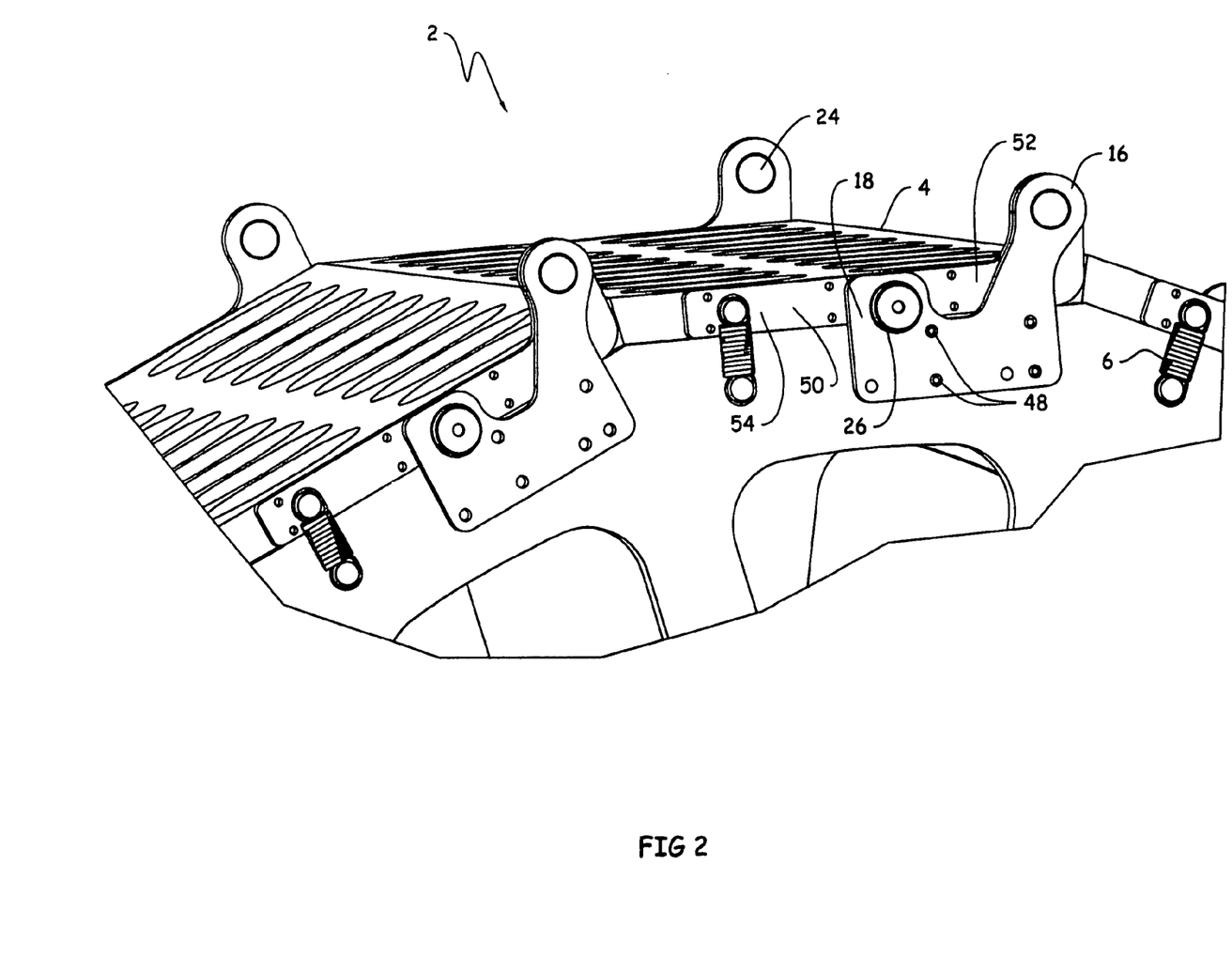
FIG. 2 is an enlarge portion of a side view of the rotary forming drum showing the insert trays and the hinges on such trays, along with external return springs.

FIG. 2 is a full side view of the rotary forming drum 2 with an emphasis on the insert trays 4. This Figure shows the trays 4 and the roller cam 26 which allows the tray 4 to move away from the rotary drum 2 to allow for the quick, clean and effective removal of the thermoformed product from the trays 4. The cam follower 98 activates the roller cam 26 forcing the insert tray 4 to move away from the forming drum 2. The internal return spring 96 (not shown) and the external return spring 6 return the insert tray to its original position. It should be noted that in the prior art devices, the trays are stationary and the product is pulled away from the tray. With the device of the instant invention the tray 4 moves out away from the rotary forming drum 2 giving the product a lifting movement instead of a pulling motion. The tray 4 is connected to the drum 2 via a drum hinge 15 and a hinge pin 24. The distal end 18 of the drum hinge 15 is attached to the rotary forming drum 2 through attachment points 48. The near end 16 of drum hinge 15 is attached to the tray 4 via the hinge pin 24. The pin 24 allows the tray 4 to pivot out away from the rotary forming drum 2 when the roller cam 26 is activated. The external spring 6 prevents the tray 4 from moving to far away from the rotary forming drum 2 and also returns the tray 4 to its original position so it can perform its task repeatedly.

Figure 3:
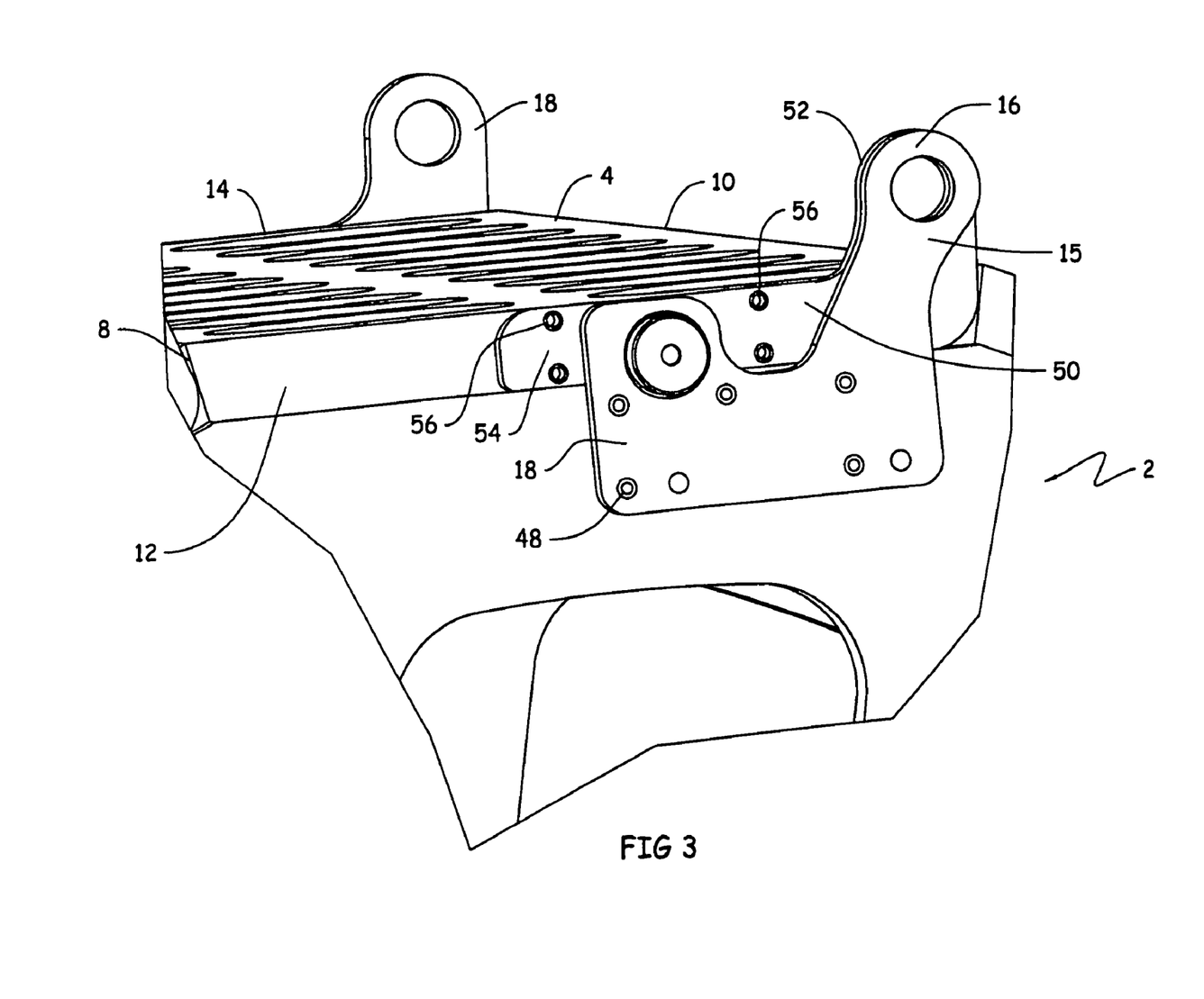
FIG. 3 is a much enlarged side view of the hinges on the trays without the roller cam, hinge pin or fastening hardware.

FIG. 3 is a full side view of insert tray 4 without the roller cam 26, hinge pin 24 or fastening hardware 48. This Figure allows for a clearer look at the relationship between the rotary forming drum 2 and the tray 4. The rotary forming drum hinge 15 is attached to the rotary forming drum 2 at attachment points 48. The near end 16 of drum hinge 15 has an opening therethrough 58 which facilitates the hinge pin 24 allowing the tray 4 to pivot. The tray 4 has a near end 12 and a distal end 14. Near the distal end 14 of the tray 4 is the tray hinge 50. The tray hinge 50 is attached to the tray 4 at attachment points 56 at the near end 54 of tray hinge 50. The distal end 52 of the tray hinge 50 also has an opening therethrough 60 that contains the hinge pin 24. The tray 4 with rear 10 and front 8 are much clear in this Figure. The drum hinge 15 and the tray hinge 50 assemblies are identical for both the near end 12 and the distal end 114 of the tray 4.

Figure 4:
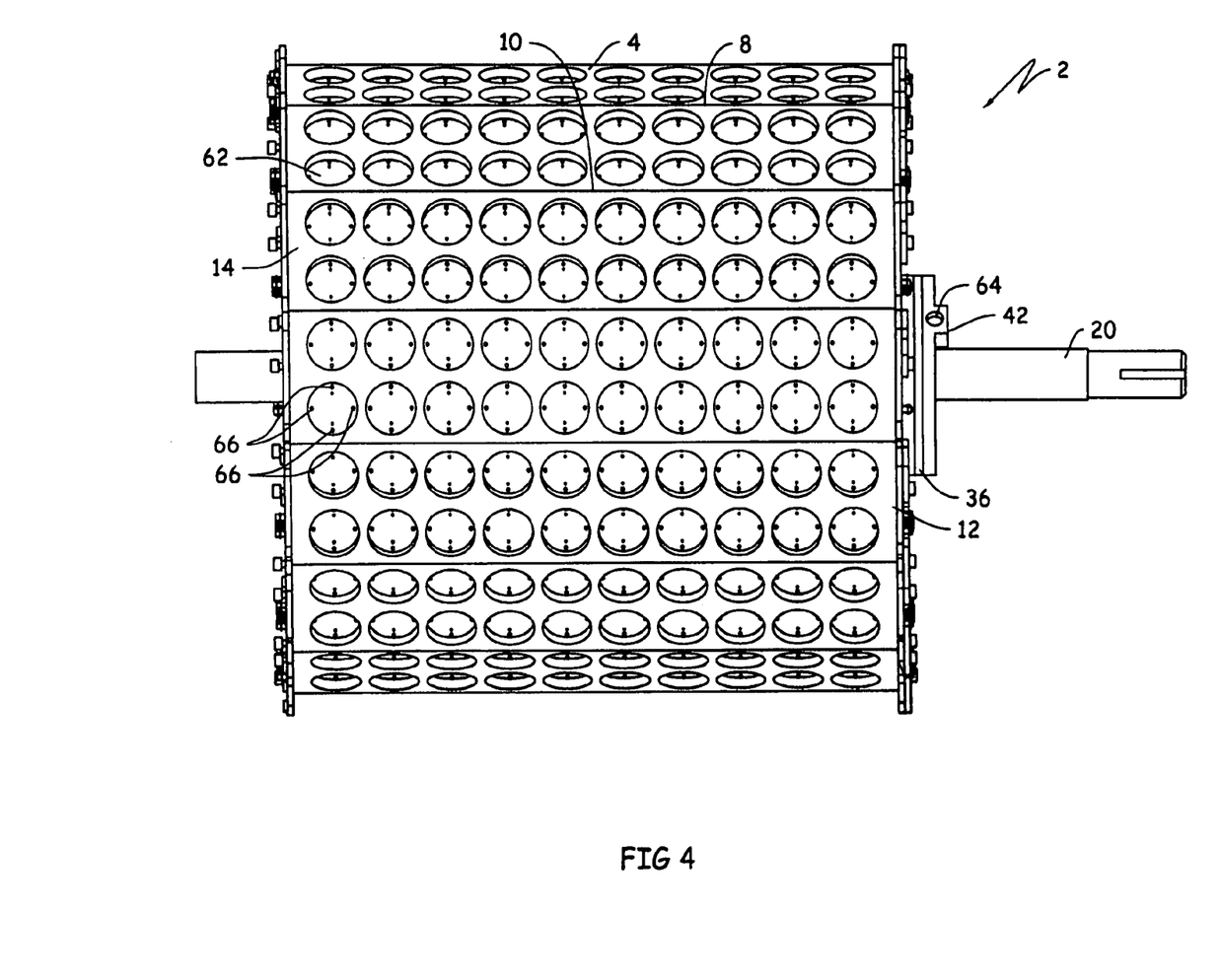
FIG. 4 is a full front view of a rotary forming drum with inserts shown in one tray.

FIG. 4 is a side view of a rotary forming drum 2 with one tray 4 containing inserts 22 (not shown). When in use the drum 2 will have inserts 22 in every tray 4. This Figure also shows the front 8 and rear 10 of the tray 4. Also shown are the near end 12 and distal end 14. Each insert opening 62 is configured the same as the others with a multiple vacuum openings 66 within. Also shown in this Figure is the relationship between the rotary forming drum 2, the vacuum zone plate 36, the vacuum adaptor plate 42 and the vacuum connection 64 to the vacuum adaptor plate 42. Also shown is the drive axle 20.

Figure 5:
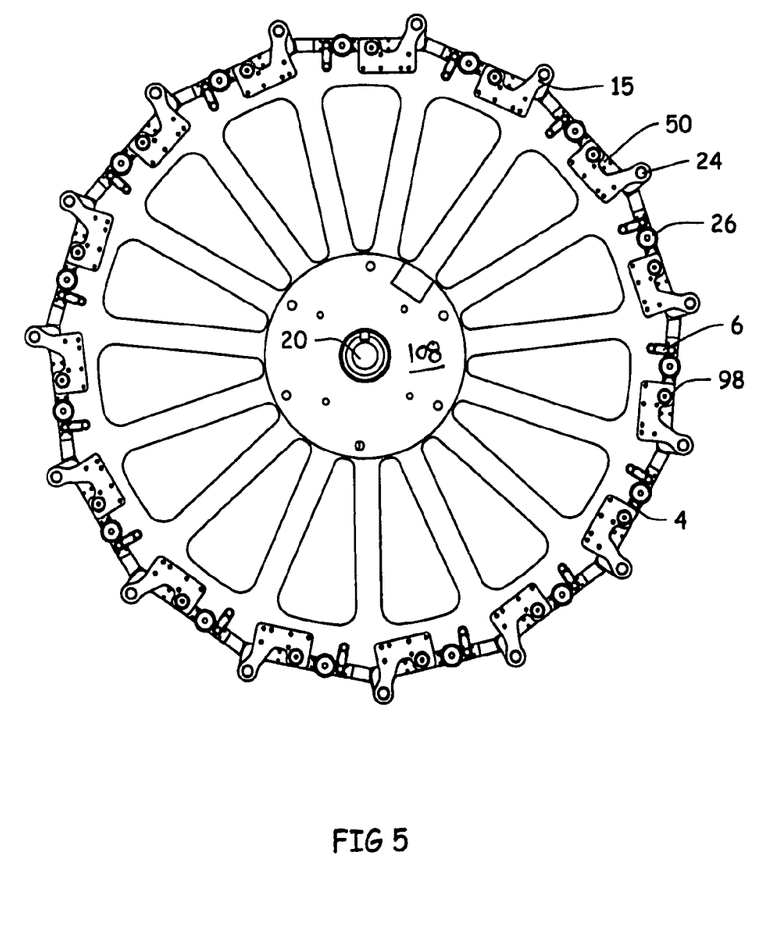
FIG. 5 is a full end view of a rotary forming drum.

FIG. 5 is an end view of a rotary forming drum 2. This Figure shows the insert trays 4 with the essential hardware to perform their operation. Each insert tray is configured exactly the same as the others. The tray 4 is attached to a tray hinge 50 that is connected by hinge pin 24 to the drum hinge 15. During operation the cam follower 98 is activated urging the cam drum 26 to force the tray 4 away from the drum 2. When the external spring 6 reaches it limit it along with the internal spring 96 (not shown) the tray 4 moves back into its original position. Also shown is the drive axle 20.

Figure 6:
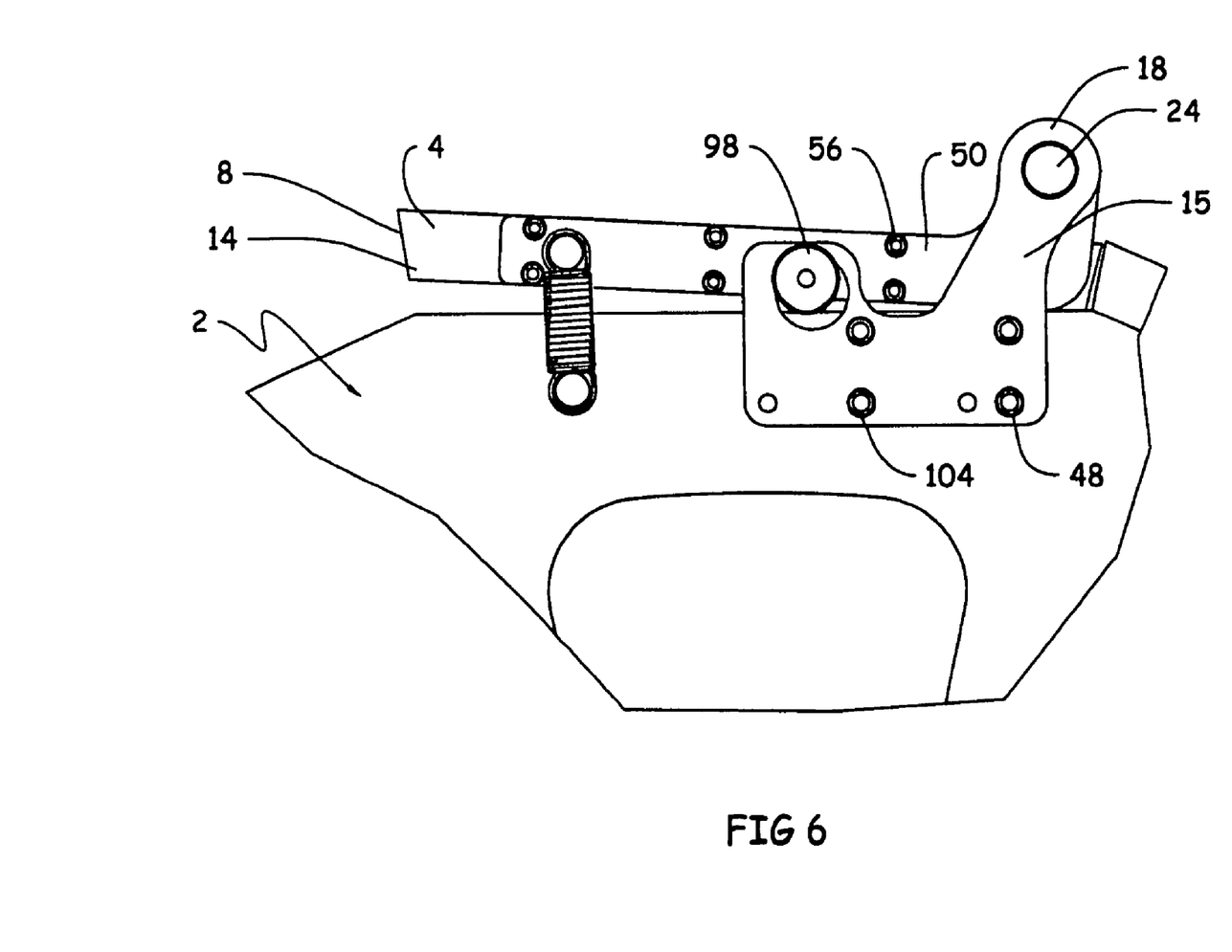
FIG. 6 is an enlarged end view of a tray moved from the wheel of the forming drum.

FIG. 6 is an external end view of an insert tray 4. This Figure represents the insert tray 4 in a lifted position. It is clear that a gap exists between the insert tray 4 and the rotary forming drum 2. This is one essential difference between the instant invention and the prior art. The movement of the tray 4 away form the drum 2 allows the product to come off the drum 2 easier than the prior art methods that pull the product directly from the drum. The pivoting tray 4 allows the product a better angle to leave the drum 2 giving a higher quality product. This Figure also clearly shows detail in drum 2 in relation to the tray 4 and their attachment to one another. Drum hinge 15 is attached to the drum 2 via fasteners 104 in openings therethrough 48. The tray 4 has tray hinge 50 attached to it via fasteners 104 through openings therethrough 56. The drum hinge 15 and the tray hinge 50 are joined via hinge pin 24. Also shown is cam follower 98.

Figure 7:
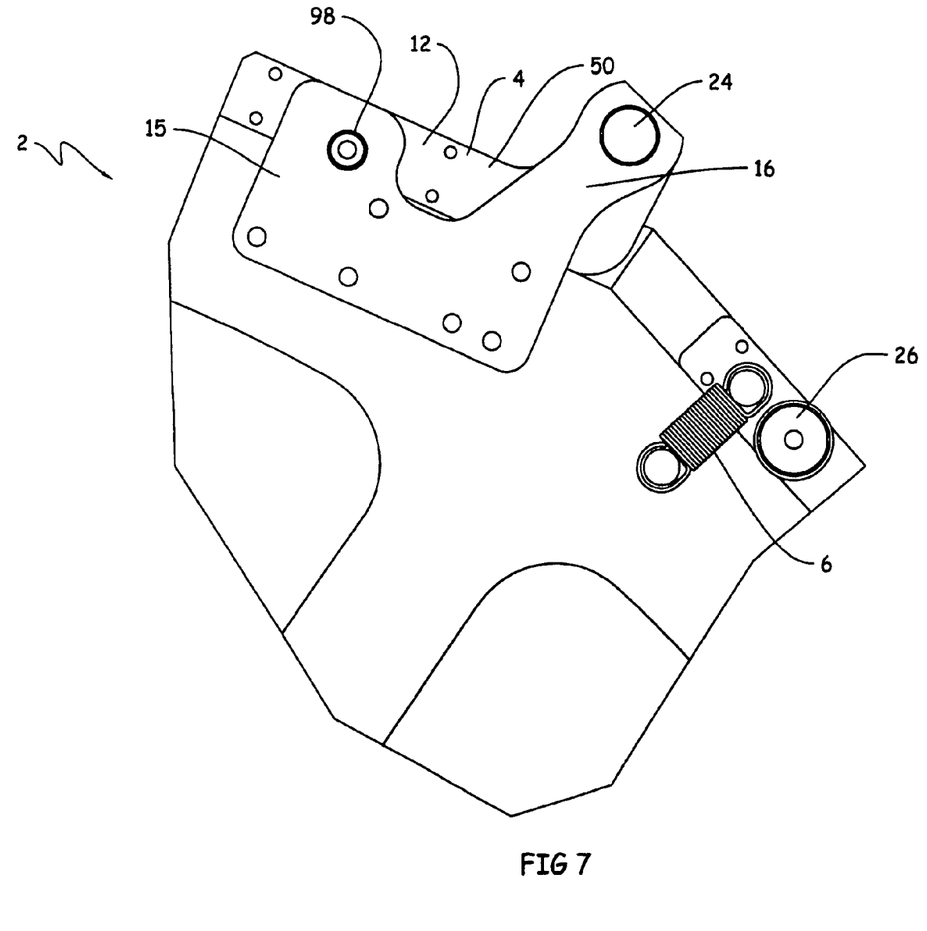
FIG. 7 is an enlarged view of the insert tray, roller cam and return spring.

FIG. 7 is a view of the insert tray 4, roller cam 26 and external return spring 6. The tray 4 is attached to the drum 2 via the drum hinge 15 and the tray hinge 50 by the hinge pin 24. This view uses the near end 12 of the tray 4. The end of drum 2 and the tray 4 are identical. The configuration for each tray end is the same throughout the entire drum 2. Also shown is the external spring 6, the roller cam 26 and cam follower 98.

Figure 8:
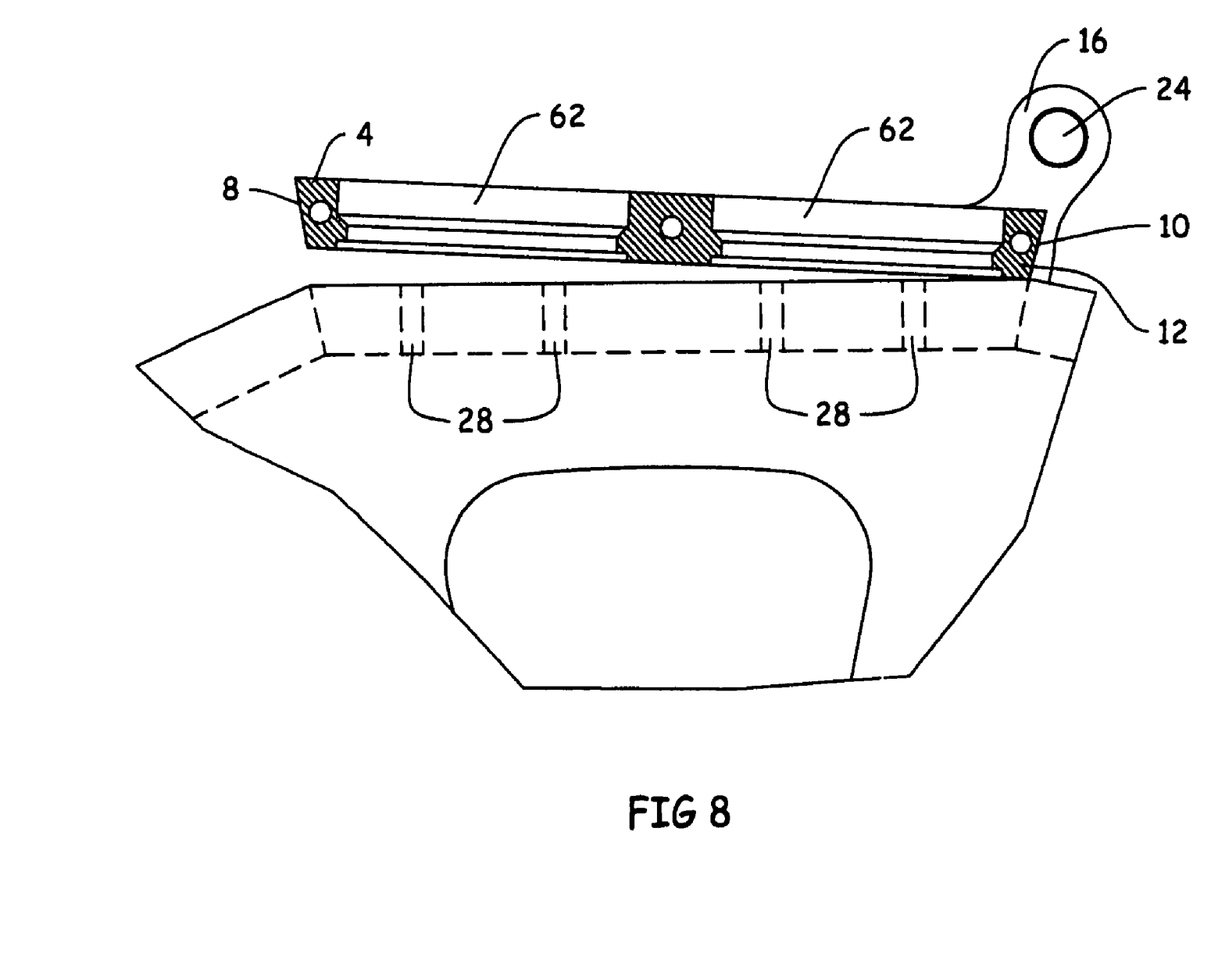
FIG. 8 is a cross sectional view of the tray of FIG. 6 through line A-A.
Figure 10:
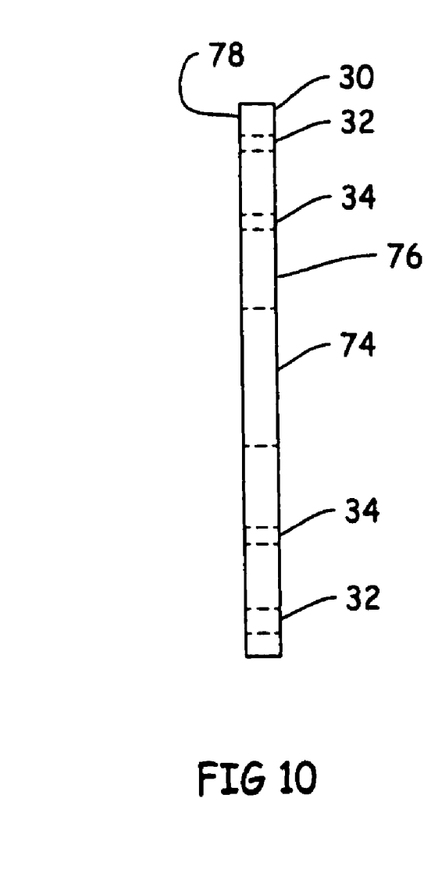
FIG. 10 is a side view of the vacuum plate.

FIG. 8 is an internal view of an insert tray 4. This shows the tray 4 and its internal relationship to the rotary forming drum 2 vacuum system 28 to the insert trays 4. The inserts 22 are perforated and sit within insert openings 22 of the insert tray 4. A vacuum is placed on the insert 22 through the vacuum system 28 using vacuum hoses, that pull the thermoformed plastic material into the tray 4 while that portion of the drum is in the vacuum zone. As the drum progresses it passes outside of the vacuum zone, eliminating the vacuum from that tray and the cam roller moves the tray away from the forming drum as depicted in FIG. 10. Then it is removed more effectively from the tray 4 because of the angle that tray 4 has assumed. After the product is removed the insert tray spring 6 returns the tray to its original position to repeat the process.

Not shown are the internal return spring 96. These springs 96 are internal to the drum and support the return of the tray 4 to its original position.

Figure 09:
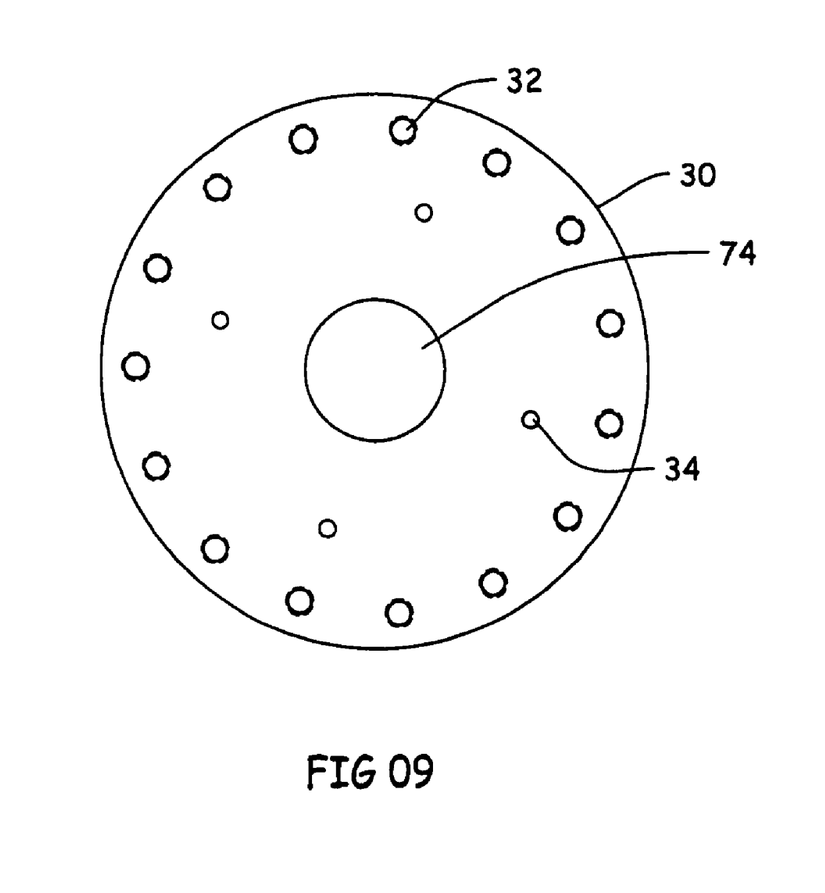
FIG. 9 is a front view of the vacuum induction plate.

FIG. 9 is a front view of the vacuum induction plate 30. The vacuum induction plate 30 slides over the drive axle 20 and secures against the rotary forming drum 2 via the opening therethrough 34 and the plate 30. The vacuum induction plate 30 has vacuum induction openings 32. The vacuum induction openings 32 are from the front surface 76 of the plate 30 to the rear surface 78 of the plate 30. The vacuum induction openings 32 align with the vacuum hoses 106 (not shown) of the drum 2. The vacuum hoses 106 are part of the vacuum system 28.

FIG. 10 is a side view of the vacuum induction plate 30 with the axle opening 74 shown in phantom. Also shown in phantom are the induction plate openings 32 and attachment openings 34.

Figure 11:
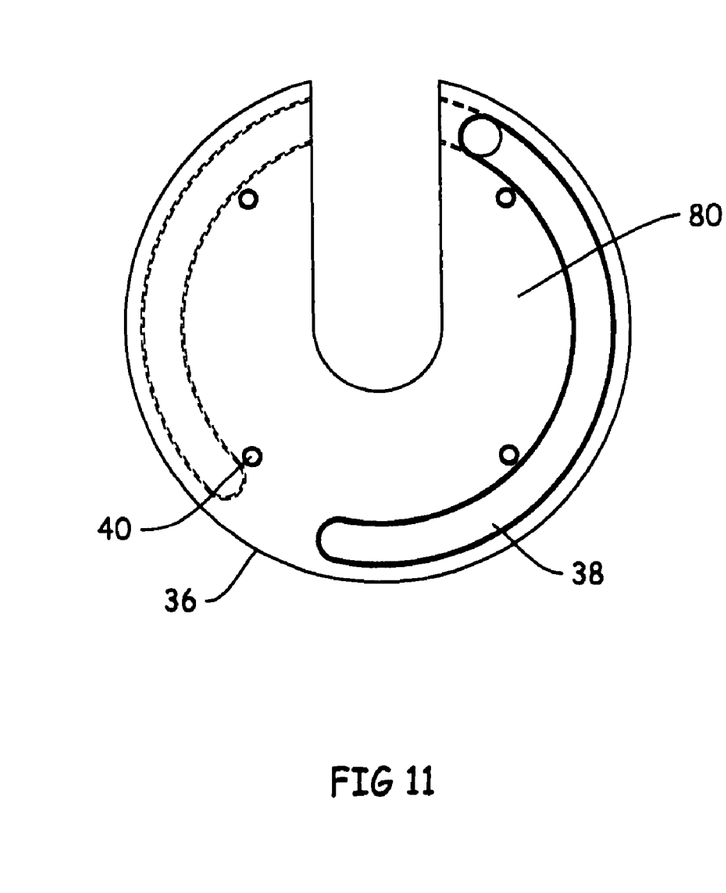
FIG. 11 is front view of the vacuum zone plate.

FIG. 11 is front view of the vacuum zone plate 36. This is another novel feature of the invention as far as the vacuum control system is concerned. The vacuum zone plate 36 attaches to the vacuum induction plate 30 with the front surface 76 of 30 mounted to the rotary forming drum 2 and the rear surface 78 mounted to the back surface 80 of the vacuum zone plate 36. The vacuum zone plate 30 has a vacuum zone slot 38. This slot is an opening in the back of plate 36 and it resembles an arcuate opening spanning approximately half the circumference of the back 80 of plate 36. This arcuate opening aligns with a portion of the vacuum induction openings 32 of plate 30. As the openings 32 move into the zone 38 they are under vacuum. This vacuum draws through the induction plate 30, through the hoses 106 into the insert trays 4 drawing the thermoformed plastic into the inserts 22. When the openings 32 pass out of the vacuum zone 38 the vacuum is released. At this point the follower cam 98 begins to move, pushing the roller cam 26, forcing the inert tray 4 away from the drum 2 in preparation for the removal of the product. The plate 30 is attached to the drum 2.

Figure 12:
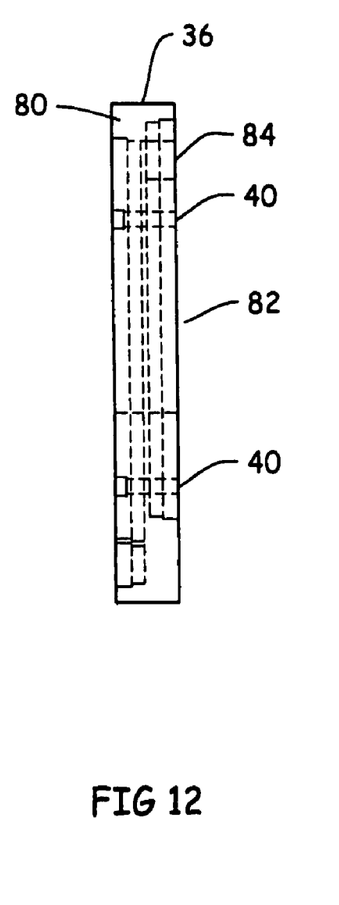
FIG. 12 is a side view of the vacuum zone plate.

FIG. 12 is a side view of the vacuum zone plate 36. This Figure shows the front surface 82 and back surface 80 of the vacuum zone plate 36. Shown in phantom are the opening therethrough 40 of plate 36. The vacuum zone slot 38 is also shown on the back surface 80. The front surface 82 of plate 36 has an opening 84 that interfaces with the vacuum adaptor plate 42. The plate 36 is not attached to the vacuum induction plate 30 and this arrangement allows one to pass the other while maintaining a vacuum between them.

Figure 13:
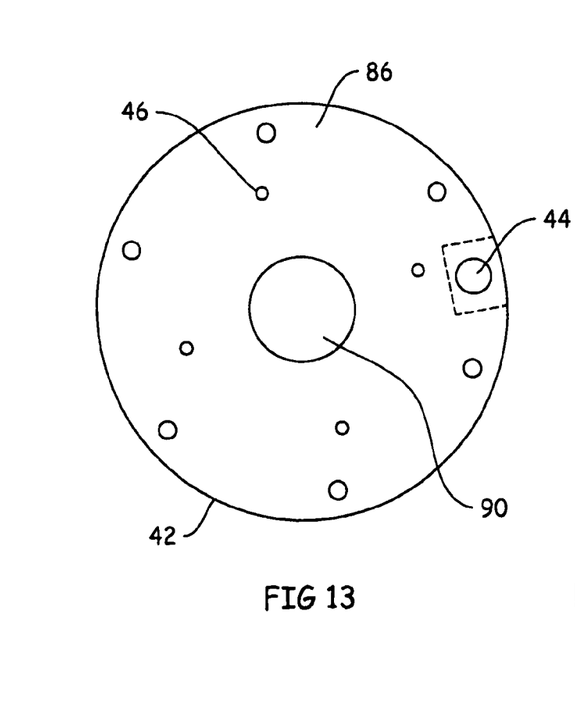
FIG. 13 is a front view of the vacuum adaptor plate.

FIG. 13 is a front view of the vacuum adaptor plate 42. The plate 42 is attached to plate 36 and the vacuum passes from plate 42 to plate 36 via the induction opening 44 of plate 42. The front surface 82 of plate 36 attaches to the rear surface 86 of the plate 42. The plates are aligned so that the opening 84 in the front surface 82 of plate 36 and the opening 44 in the rear surface 82 of plate 42 allow for the transfer of vacuum between plate 36 and 42. Also shown is the axle opening 90 of plate 42.

Figure 14:
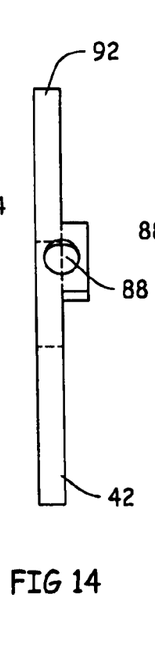
FIG. 14 is a side view of the vacuum adaptor plate.

FIG. 14 is a side view of the vacuum adaptor plate 42. The opening 92 in the outside surface of plate 42 is the point where the vacuum induction 44 is attached to the vacuum system 32 that operates the vacuum controls of the drum 2.

Figures 15, 16:
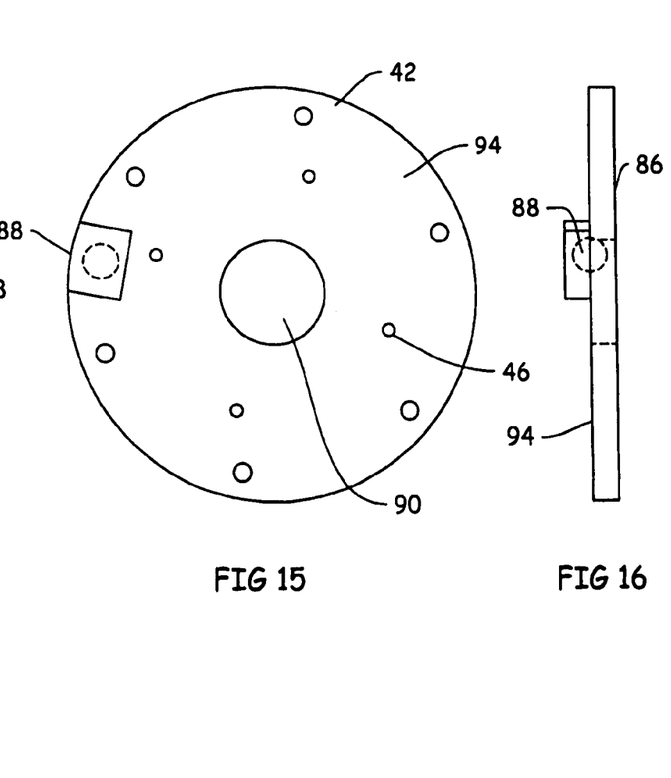
FIG. 15 is a rear view of the vacuum adaptor plate.
FIG. 16 is a side view of the vacuum adaptor plate.

FIG. 15 is a rear view of the vacuum adaptor plate 42. The plate 42 is attached to the vacuum zone plate 36 via openings 46 through the front surface 94. The plates are aligned to allow for vacuum flow from plate 42 to plate 36. The front surface of plate 42 has a vacuum system attachment point 88. This attachment point 88 is where the vacuum is attached to the vacuum system 32 of drum 2. This plate 42 also has an axle opening 90.

FIG. 16 is a side view of the vacuum adaptor plate 42. This Figure shows the front surface 94, the rear surface 86 and the vacuum system attachment point 88.

The instant device is a rotary forming drum 2 with pivoting insert trays 4. The drum 2 is mounted on a drive axle 20. The drum is equipped with an internal vacuum distribution and control system 32. The insert trays 4 are mounted to the rotary forming drum 2 and use vacuum induction to draw molten thermoformed plastic within the confines of the inserts 22 producing a finished plastic product. The trays 4 are manufactured with passages that run from the base of the insert trays 4 to vacuum hoses 106 of the drum 2. The vacuum hoses 106 of the drum 2 are also manufactured for passage that allows the transmission of vacuum from the induction plate 30 to the insert tray 4 openings 66 providing the fluid transmission to the insert trays 4. These vacuum hoses 106 are supplied with the vacuum as it is received through a series of plates that allow the transfer to be performed in a measured quantity based upon the amount of time the vacuum induction plate 30 openings 32 are shown in conjunction with the vacuum zone plate 36. Before openings 32 reach the arcuate opening or vacuum zone slot 38 in the vacuum zone plate 36 there is no effect upon them or their internal vacuum system. However, once an opening is exposed to the vacuum zone 38 of the vacuum zone plate 36 the vacuum will draw the molten thermoformed plastic within the insert trays confines and the thermoformed plastic will remain under the effects of the vacuum until the opening passes beyond the arcuate opening or vacuum zone slot in the vacuum zone plate 36. Once the vacuum is no longer present a cam follower acts upon a roller cam activating or moving the insert tray 4 away from the drum 2 reducing the angle at which the product is removed from the insert tray 4 and the drum 2. This pivoting motion of the insert tray 4 provides a cleaner more effective release of the product form the inserts 22 creating a higher quality product.

The vacuum system 32 consists of the vacuum adaptor plate 42, the vacuum zone plate 36, and a vacuum induction plate 30, and a series of vacuum hoses 106 that span from the induction plate 30 to the insert trays 4. When the vacuum is activated those openings 44 of the induction plate 30 that are currently over the vacuum slot 38 of the vacuum zone plate 36 are activated placing each insert 22 on that particular tray 4 to induce a vacuum, subjecting the thermoformed plastic to be inducted within the insert 22 forming the product. The rotation of the drum is continuous and the drum and its vacuum and pivoting tray movements are therefore repeated constantly through the thermoforming process.

What is claimed is:

1. A method of forming plastic articles, said method comprising:
  - (I) utilizing a rotary forming drum, said rotary forming drum comprising in combination: a vacuum distribution and control system, a plurality of pivoting trays connecting two spaced-apart drums;
    said vacuum distribution and control system comprising a vacuum zone, said vacuum zone comprising a vacuum induction plate, a vacuum zone plate and a vacuum adaptor plate;
    said vacuum induction plate being mounted to said forming drum and containing a plurality of openings therethrough;
    said vacuum zone plate surmounting said induction plate and having an arcuate slot adjoining the plurality of openings through said induction plate;
    said adaptor plate being surmounted on said vacuum zone plate with an opening therethrough to permit vacuum flow therethrough;
    vacuum hoses connecting said vacuum distribution and control system to said trays; each said pivoting tray being controlled by a roller cam, a cam follower, internal return springs, and external return springs,
    wherein each pivoting tray is capable of outward movement away from the rotary forming drum, effected by the cam follower and the roller cam, each pivoting tray containing forming inserts, said rotary forming drum having a top portion and a bottom portion;
  - (II) feeding thermoformable plastic to the rotary forming drum onto the top portion while rotating the drum;
  - (III) drawing a vacuum on a portion of the forming tray inserts to draw the thermoformable plastic into the forming tray inserts;
  - (IV) holding the vacuum on the said tray inserts until the thermoformable plastic has conformed to the forming inserts in the tray to form molded parts;
  - (V) extracting the thermoformable plastic containing the molded parts from the rotary forming drum near the bottom portion of the rotary forming drum.

* * * * *